United States Patent [19]
Rich

[11] Patent Number: 4,585,916
[45] Date of Patent: Apr. 29, 1986

[54] TRANSVERSE FLUX INDUCTION HEATING OF METAL STRIP

[75] Inventor: Keith E. Rich, Bournemouth, England

[73] Assignee: Davy McKee (Poole) Limited, Dorset, England

[21] Appl. No.: 498,937

[22] Filed: May 27, 1983

[30] Foreign Application Priority Data

Jun. 2, 1982 [GB] United Kingdom ............... 8216096
May 5, 1983 [GB] United Kingdom ............... 8312361

[51] Int. Cl.[4] ............................................. H05B 6/44
[52] U.S. Cl. .......................... 219/10.61 R; 219/10.69;
219/10.71; 219/10.79; 219/10.43; 219/388
[58] Field of Search ............... 219/10.61 R, 10.61 A,
219/10.49 R, 10.49 A, 10.67, 10.69, 10.71,
10.79, 10.57, 10.43, 388; 432/8, 59; 266/129

[56] References Cited

U.S. PATENT DOCUMENTS

| | | | |
|---|---|---|---|
| 2,448,009 | 8/1948 | Baker | 219/10.61 R |
| 3,058,840 | 10/1962 | Kerr et al. | 219/10.61 X |
| 3,313,907 | 4/1967 | Geisel et al. | 219/10.61 |
| 3,553,414 | 10/1971 | McArthur | 219/10.71 |
| 4,158,758 | 6/1979 | Kunioka et al. | 219/10.43 |
| 4,188,731 | 2/1980 | Rauskolb | 219/388 X |
| 4,258,241 | 3/1981 | Soworowski | 219/10.71 |
| 4,379,547 | 4/1983 | Shimbashi et al. | 432/59 X |

Primary Examiner—Philip H. Leung
Attorney, Agent, or Firm—Lee, Smith & Zickert

[57] ABSTRACT

An installation comprises a support frame having a plurality of locations each of which is capable of supporting a transverse flux induction heater. The locations are movable so that in turn they can take up a position adjacent a path taken by moving metal strip to be heated. From this position, the heater supported in the location can be displaced to an operating position where the two elements of the heater are on opposite sides of the strip passing along said path.

16 Claims, 11 Drawing Figures

TRANSVERSE FLUX INDUCTION HEATING OF METAL STRIP

This invention relates to the heating of metal strip, moving in the direction of its length, by means of a transverse flux induction heater.

The principle of transverse flux induction heating is well known. Two inductor elements, each containing induction coils, are arranged in spaced apart parallel relation and the metal strip to be heated is positioned between the two elements. On energising the coils, the magnetic flux passes through the strip perpendicular to its flat surfaces. This causes induced currents to circulate in the plane of the strip. Special magnetic pole structures are used to control the distribution of the induced currents and so determine the patterns which these produce. Uniform heating is achieved when the strip is moved between the two elements to run the heat patterns together. Transverse flux induction heating operates at relatively low electrical frequencies which are carefully chosen in relation to the thickness and properties of the strip to give the most efficient heating.

If strips of various widths are to be heated, then steps have to be taken to ensure that the heating is uniform across the width of the strip. If a heater having a width equal to the maximum width of strip which can be accommodated is used, then the heater is operating wastefully when a narrower strip is being processed. Alternatively, if a narrower heater is used, then strips of larger width do not obtain uniform heating.

An object of the present invention is to provide equipment which enables these disadvantages to be overcome.

Accordingly, the invention resides in an installation comprising a support frame having at least two locations, each of which has means for supporting a transverse flux induction heater having a pair of heater elements, means for displacing the locations so that each can be brought in turn to a position close to a path taken by metal strip to be heated and moving in the direction of its length, means for displacing a heater between said position of the location and an operating position in which the elements are located on opposite sides of the path, and guide means for supporting the heater in its operating position and as it is displaced between said positions.

With the provision of such an installation, the locations in the support frame support transverse flux induction heaters of different widths. Depending upon the width of the strip to be heated, the appropriate location is moved to said position close to the path taken by the metal strip when it is to be heated, and the heater is moved from said position in the location to an operating position in which its elements are located on opposite sides of the path. In this position, the elements are energised to heat the metal strip which is moving in the direction of its length along said path. A heater is supported from guide means when it is in its operating position and also as it is displaced between its operating position and the position of the location in which it is normally stored.

If, eventually, a change of strip width is made, then the heater which has been used is displaced back into its location on the support frame, and the locations are moved until one containing a more appropriate width heater is brought to the position adjacent to the path of the strip and this second heater is then displaced into the operating position with its elements located on opposite sides of the path.

During its passage along a processing line, the metal strip may sometimes be moving horizontally and sometimes vertically and, on other occasions, at an angle inclined both to the horizontal and the vertical, but the path taken by the metal strip, when it is to be heated, is conveniently vertically. When the path taken by the metal strip is vertical, the support frame may include a fixed horizontal track and each location includes a wheeled trolley displaceable along the track. Each wheeled trolley conveniently has a pair of horizontal support rails extending at right angles to the track and the support rails serve to support a transverse flux induction heater suspended on wheels therefrom.

Again, when the path taken by the metal strip to be heated is vertical, the support frame may have its locations arranged in at least two parallel horizontal rows, each row having at least two locations therein, and the support frame is displaceable vertically and horizontally whereby each location can be brought in turn to said position close to the path.

In another arrangement, the support frame provides a continuous track and each location includes a wheeled trolley displaceable around the track.

In another embodiment of the invention, the support frame is in the form of a turntable and the locations are arranged radially of the axis of rotation of the table. By rotating the turntable, each of the locations can be brought in turn to the position from which a heater supported at the location can be displaced to the operating position with its elements positioned on opposite sides of the path taken by the strip to be heated.

When a change in the width of the strip to be heated takes place only infrequently, the changeover of the heaters of the different widths can take place when the strip is stopped, or, if the strip continues to move, that portion which passes the heaters during the changeover period can, subsequently, be scrapped. If, on the other hand, changes in widths of the strip to be heated occur fairly frequently, then it is desirable that there should be a minimum of time taken in order to changeover the heaters, so that there is no need to stop the movement of the strip and the amount of strip which is wasted, due to it not being heated uniformly, is minimal. To this end, an installation comprises a support frame having at least two locations, each of which has means for supporting a transverse flux induction heater having a pair of heater elements, means for displacing the locations so that each one can be brought in turn to first and second positions close to a path taken by metal strip moving in the direction of its length, means for displacing a heater between said first position and the first operating position in which the elements are located on opposite sides of the path, guide means supporting the heater in said first operating position and as it is displaced between said first position and said first operating position, means for displacing a heater between said second position and a second operating position in which the elements are located on opposite sides of the path, and guide means for supporting the heater in said second operating position and as it is displaced between said second position and said second operating position.

In using such an installation to heat metal strip moving in the direction of its length, a first transverse induction heater is displaced from the first position to said first operating position and is energised to heat strip passing along said path, a change in strip width is detected before it reaches the first induction heater and a second induction heater of the appropriate width is displaced from the second position to said second operating position and, when the change in width of the strip reaches the second heater, the second heater is energised and the first heater is de-energised.

In order that the invention may be more readily understood, it will now be described, by way of example only, with reference to the accompanying drawings, in which.

Figure 1:
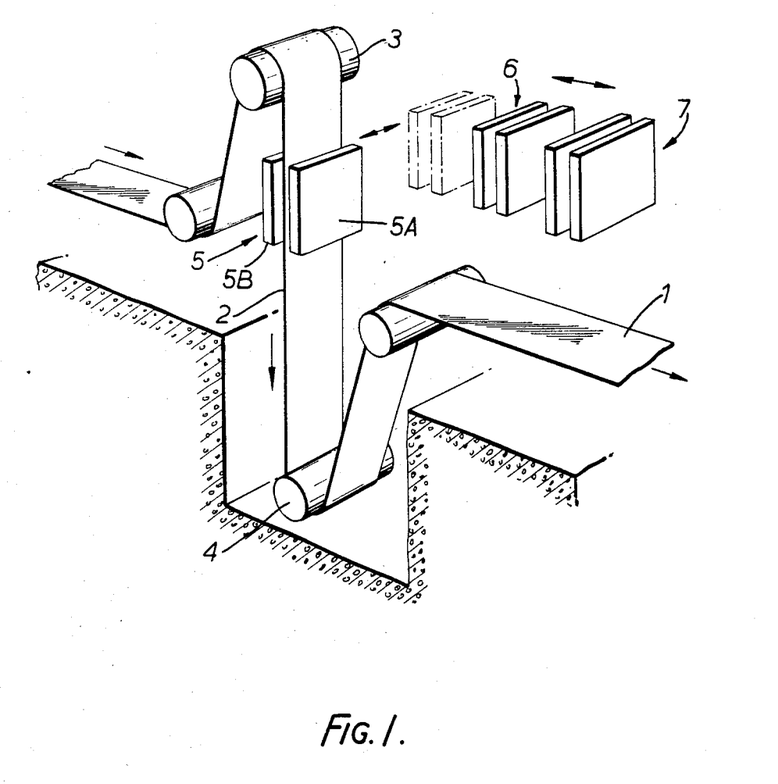
FIG. 1 is diagrammatic perspective view of an installation in accordance with the present invention.

A metal strip, which may, for example, be aluminium or steel, is moving in the direction of its length through a processing line and, in this line, there is a station where the strip is to be rapidly heated. This may be for the purpose of annealing or for drying a material deposited on the strip. During its passage through the processing line, the strip may sometimes be moving horizontally, sometimes vertically, and sometimes at an angle inclined to the horizontal and the vertical but, in the arrangement shown in FIG. 1, at the station where it is heated, the strip 1 is moving along a vertical path 2. At the upper end of the path, the strip material passes around a roller 3, and, at the lower end of the path, it passes around another roller 4. As the strip passes along the path 2, it is rapidly heated by means of an electric transverse flux induction heater 5. The heater consists of two elements 5A, 5B, each of which consists of a plate-like structure containing electrical coils whereby, when the coils are energised with an alternating supply, magnetic flux travels transverse to the metal strip causing eddy currents to be set up in the strip to heat it. The moving strip is brought to a closely controlled temperature in the time taken to traverse the length of the elements. Each element requires a heavy current supply and cooling water which is fed through water cooled cables (not shown). The frequency of the supply to the heater is dependent on the material from which the strip is formed and of its thickness. As an example, aluminium in the range 0.5-1.5 mm thick requires a frequency of around 200 Hz. Ferrous materials require considerably higher frequencies. The width of each element is closely related to the width of the strip to be heated. If the width of the strip is changed, then elements 5A may be of the incorrect width to produce uniform heating across the width of the strip. To this end, it may be necessary to replace the heater with another heater 6 or 7 having elements of the appropriate width. The heaters are supported in a support frame positioned at one side of the path taken by the metal strip. The support frame is arranged such that each heater can be moved in turn to a position from which it can readily be displaced to the position where it has its elements on opposite sides of the strip moving along the path. It is, therefore, a relatively simple operation to replace one heater with another heater of the more appropriate width when the width of the strip which is being heated is changed.

Figure 2:
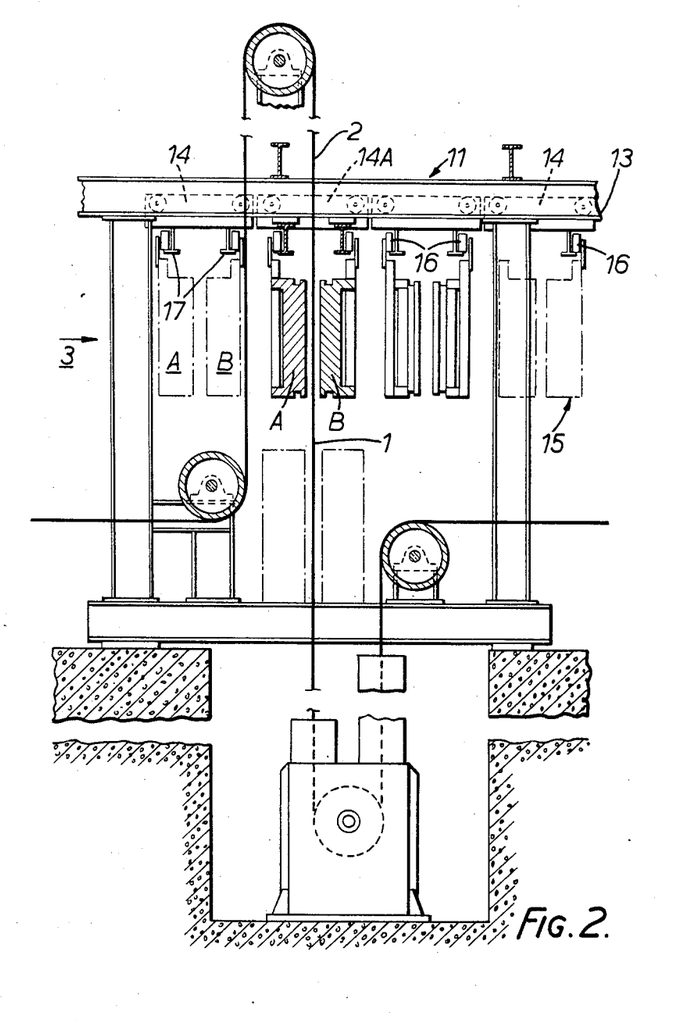
FIG. 2 is a sectional side elevation of an installation taken on the line 2—2 of FIG. 3.
Figure 3:
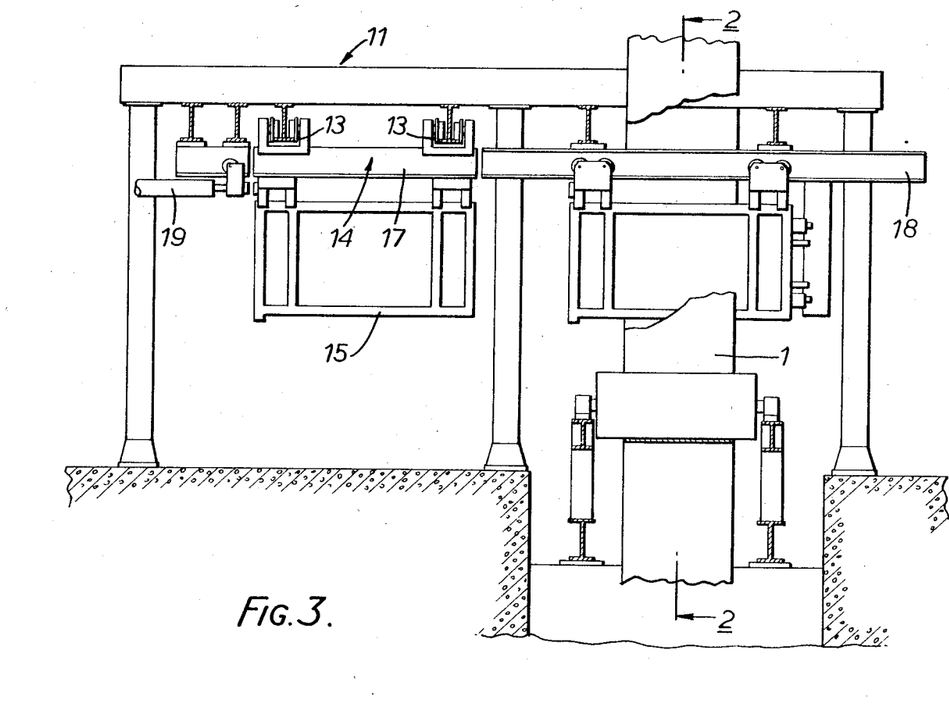
FIG. 3 is a front elevation of the installation shown in FIG. 2 and in the direction of the arrow 3.

Referring to FIGS. 2 and 3, a support frame 11 is positioned at one side of the vertical path 2 taken by a metal strip 1 to be heated. The support frame 11 has a fixed horizontal track 13 on which are supported a plurality of wheeled trolleys 14. Each trolley constitutes a location in which a transverse flux induction heater 15 can be supported. Each heater has two elements A, B, and each element has wheels 16 at its upper end which are supported on a pair of horizontal support rails 17 which extend beneath the trolleys at right angles to the track 13. A fluid operable piston-cylinder (not shown) engages against the trolleys to displace them along the track 13 so that each location can in turn take up a position 14A which is close to, and on one side of, the path 2. In this position, the support rails 17 on the trolley are aligned with a pair of tracks 18 supported from the frame 11 and positioned one on each side of the path 2. When a trolley is in the position 14A, the two elements of the induction heater can be pushed by means of a fluid operable piston-cylinder device 19 from the trolley on to the support rails 18 so that the elements take up a position on opposite sides of the vertical path 2. It is then simply a question of supplying the electrical power to the heater. When it is necessary to make a change in the heater which is to be used, the heater in the operating position is drawn back on to its trolley in the position 14A and the locations are then moved sideways until a trolley carrying a more appropriately sized heater is moved to the position 14A. The two elements of the heater are then pushed into the operating position and connected to the electrical supply. Although in the FIGS. 1, 2 and 3 the elements are shown as being completely separate, they can be connected together at one end so that they are of generally U-shape in plan.

Figure 4:
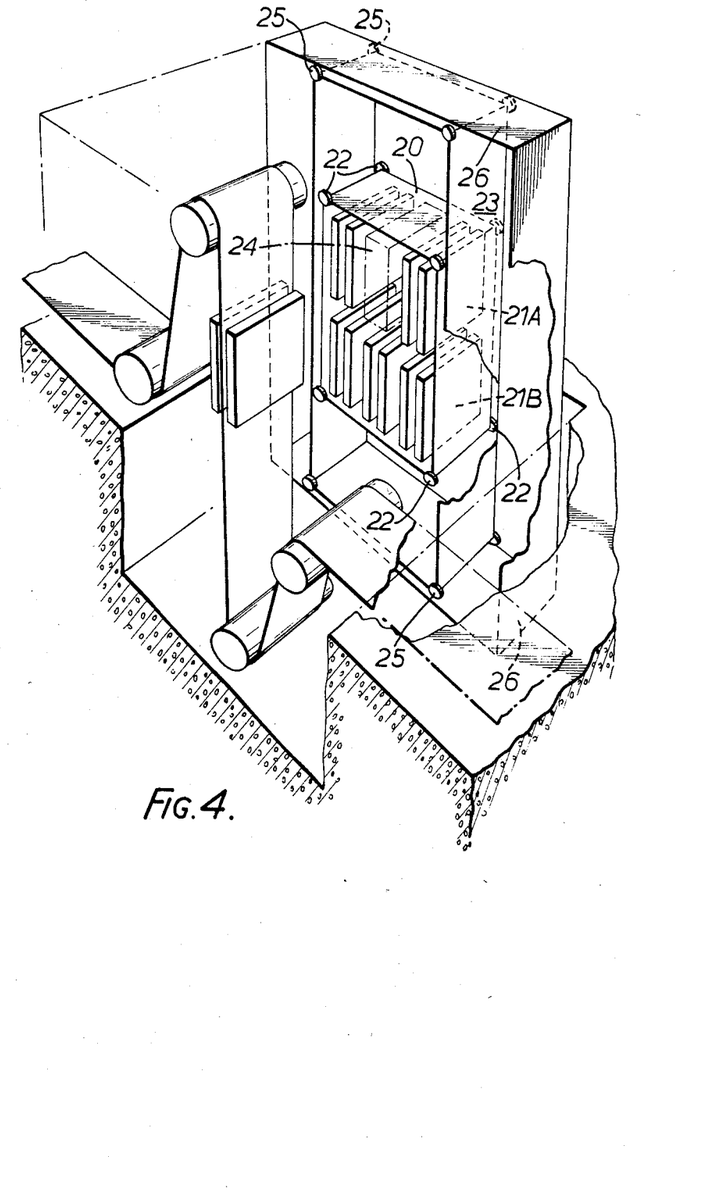
FIGS. 4, 5, 6 and 7, are each a diagrammatic perspective view showing an alternative embodiment of the invention.

In the arrangement shown in FIG. 4, a compact installation is obtained by arranging for the locations in the support frame 20 to be arranged in at least two rows, one above the other, with at least two locations in each row. In the arrangement shown, the locations are arranged in two rows 21A, 21B and the support frame 20 is provided with sets of wheels 22 which enable the frame to be moved vertically in a guide frame 23. By moving the frame vertically, heaters in either of the rows 21A or 21B can be brought to the position 24 where it can be transferred to the operating position for heating the metal strip. The frame 23 also has wheels 25 which enable the frame to be moved horizontally in a horizontal guide frame 26. Thus, when the appropriate row of locations has been determined, the frame is moved sideways to bring the selected location in that row to the position 24 from which the heater in that location can be transferred to the operating position.

Figure 5:
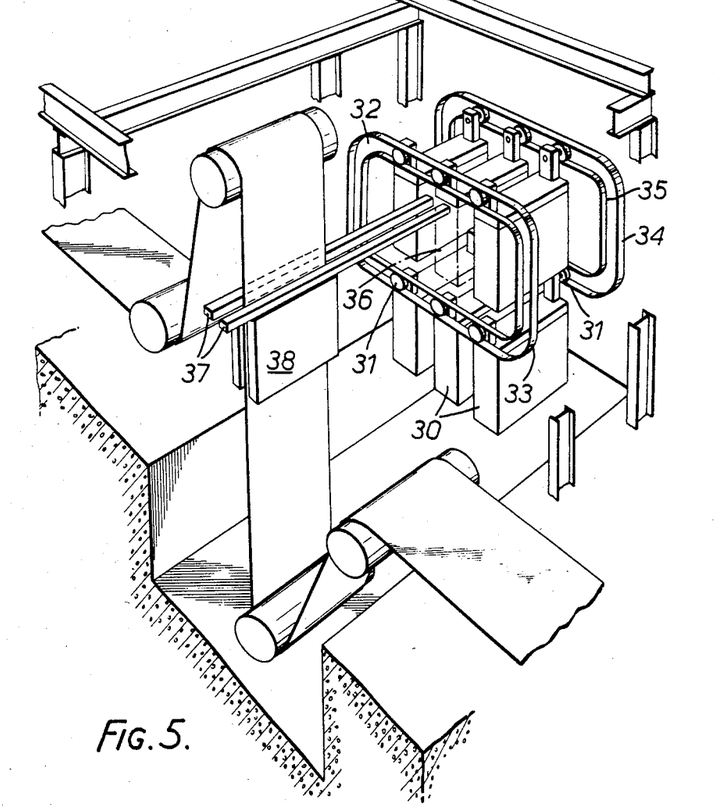

In the arrangement shown in FIG. 5, each heater 30 is provided at its upper end with a pair of wheels 31. The wheel at one end of each of the heaters is positioned in a continuous slot 32 provided in a vertically inclined guide 33. A similar vertically inclined guide 34 is arranged parallel to the guide 33 and a slot 35 provided by the guide receives the wheel at the other end of each of the heaters. The heaters can thus be moved continuously around the track provided by these two guides and any one of the heaters can be brought to the position 36 from which it can be displaced along a pair of horizontal guide rails 37 to the operating position indicated by reference 38. Changing the heater is a simple matter of returning the heater which has been in use along the rails 37 to the appropriate location and a new location brought to the position corresponding to location 36 from which the new heater can be disconnected from its support wheels and then displaced along the support rails 37 to the operating position 38.

Figure 6:
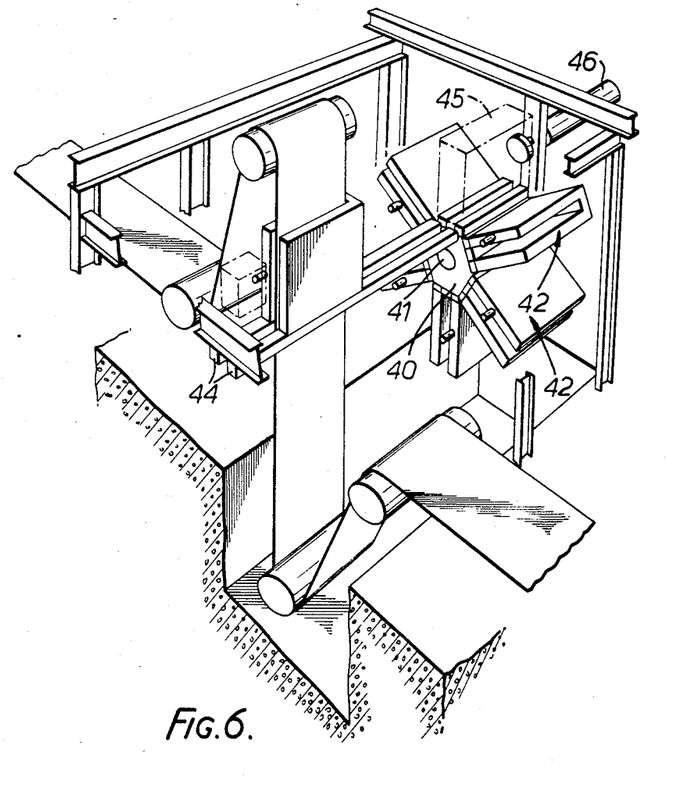

In FIG. 6, the support frame 40 is rotatable about a horizontal axis 41 and the various heaters 42 extend radially outwards of the axis 41 of the support frame 40. Guide rails 44 serve to guide the heater which is to be displaced from the position 45 to the operating position. Displacement of the heater is brought about by a fluid operable piston-cylinder device 46.

Figure 7:
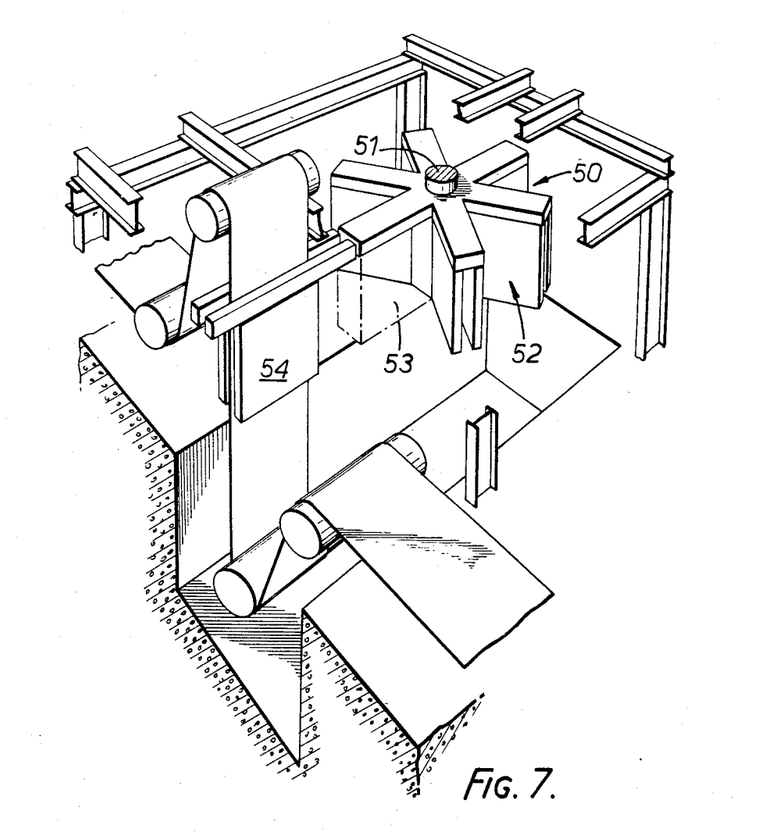

In the arrangement shown in FIG. 7, the support frame 50 is rotatable about a vertical axis 51 and, again, the locations extend radially outwards of the axis 51. A heater 52 is supported at each location and, by rotating the support frame about its axis 51, the locations are brought in turn to a position where a heater supported in the location can be displaced to the operating position 54.

The embodiments of the invention described so far have all been concerned with an arrangement where the heating occurs while the strip is passing along a vertical path.

Figure 8:
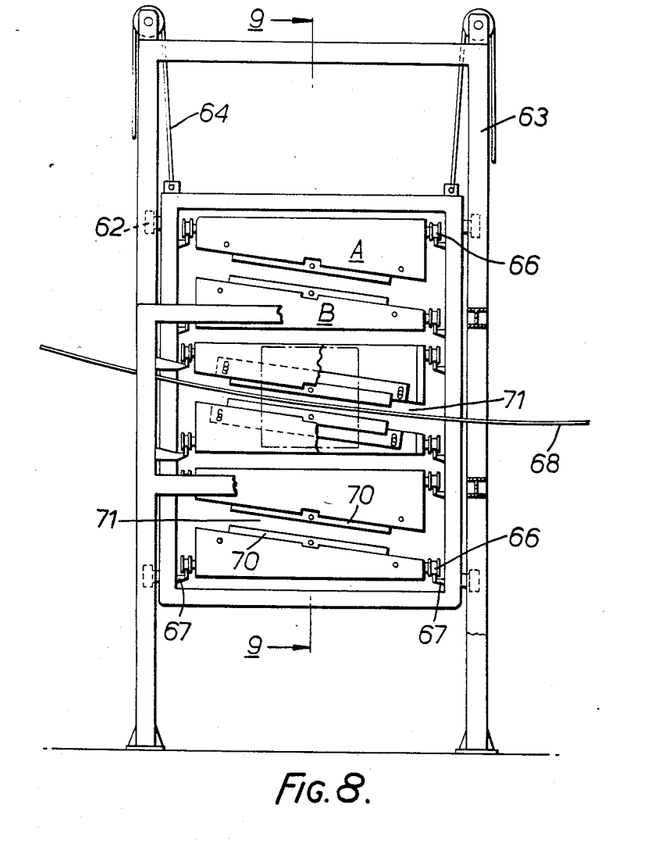
FIG. 8 is a side elevation, partly broken away, of a still further embodiment of the invention.
Figure 9:
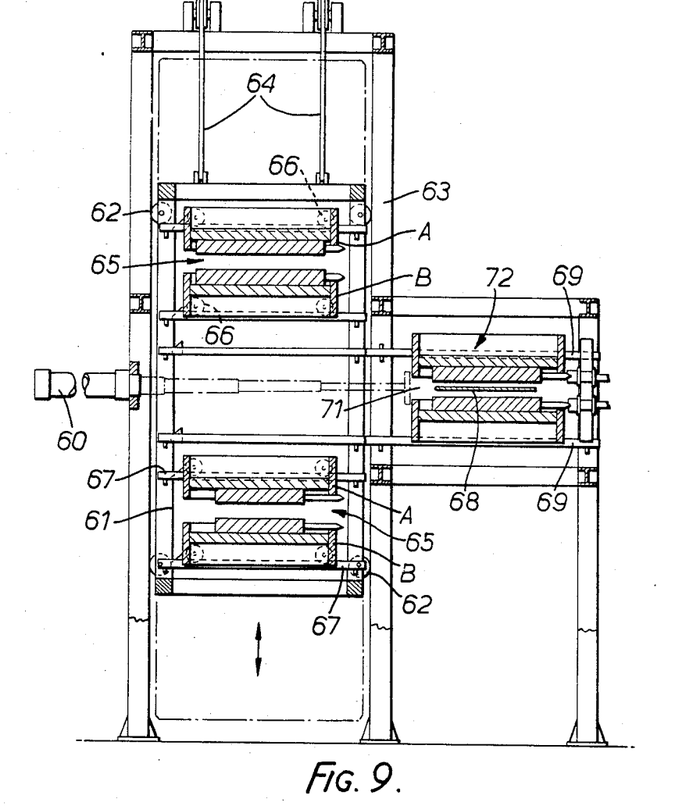
FIG. 9 is a section on the line 9—9 of FIG. 8.

In the arrangement shown in FIGS. 8 and 9, an installation allows a selected one of a number of transverse flux induction heaters to be used to heat a metal strip which is passing along a path which is part of a parabola. If a strip is passed horizontally, it will take up the position of a parabola unless it is very adequately supported. It is very difficult to support a strip so that it does not take up at least a slightly parabolic path.

Referring particularly to FIG. 9, a support frame 61 is provided with rollers 62 which allow it to be readily displaced vertically in a fixed vertical guide frame 63. The vertical movement is brought about by means including ropes or wires 64. In the frame 61, there are three locations each supporting a transverse flux induction heater 65. Each heater consists of two elements A, B, and each element has rollers 66 which enable it to be supported on, and movable along, guide rails 67. The strip is indicated by reference 68 and, in this position, it is inclined slightly to the horizontal. A pair of horizontal guide rails 69 extend from the frame 63. The two elements of a heater in each location can be displaced on to the guide rails 69 from a position in the support frame where the guide rails 67 of the location are aligned with the guide rails 69. A fluid operable piston-cylinder device 60 mounted on the frame 63 serves to displace the heater between the position in the support frame and its operating position.

Referring now to FIG. 8, it will be seen that each of the heaters has a pair of elements which have an inclined face 70 and the two elements of each heater thereby define a gap 71 which is inclined at substantially the same angle as the portion of the strip when it is at the position where it is heated. A strip 68 is shown passing through the gap 71 between the heating elements of a heater 72 which has been withdrawn from the support frame to the operating position.

Figure 10:
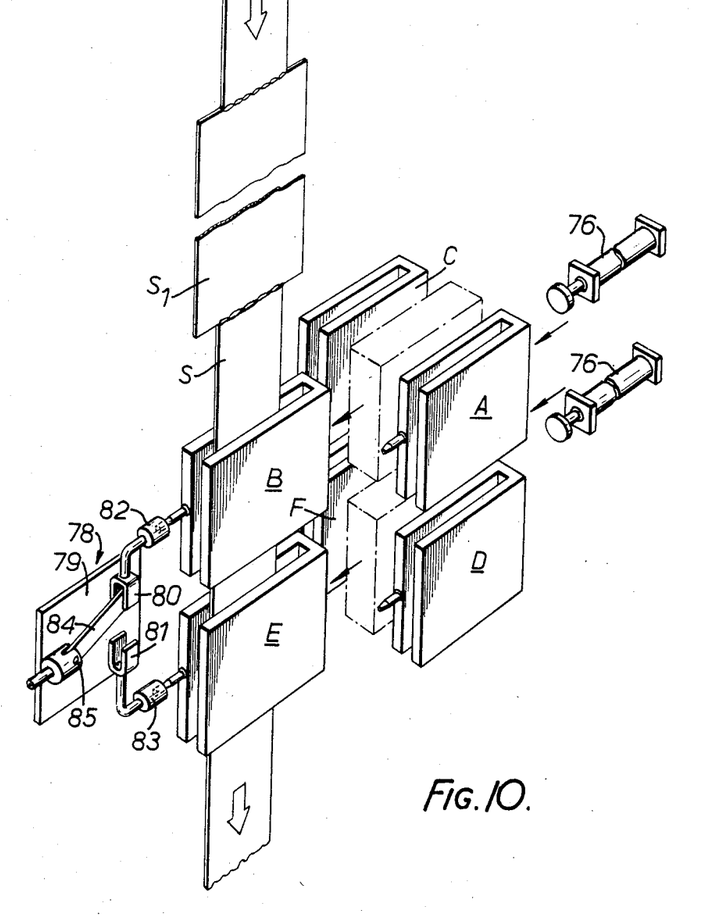
FIG. 10 is a diagrammatic view showing a still further embodiment of the invention.
Figure 11:
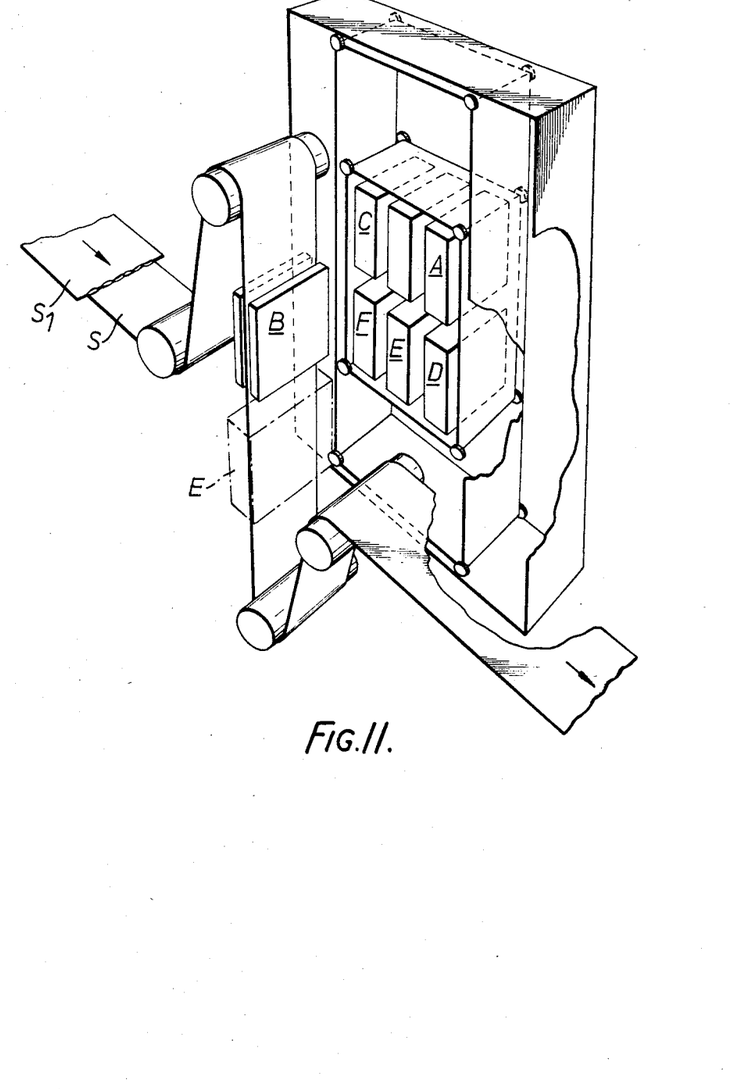
FIG. 11 is a perspective view of the installation shown in FIG. 10.

Referring now to FIGS. 10 and 11, a metal strip S is shown passing vertically downwards between the two elements of a transverse flux induction heater which is connected to a source of power to heat the strip. A support frame adjacent the strip holds a store of heaters of different widths and, by displacing the frame horizontally and vertically, an appropriate heater can be transferred from the frame to an operating position by means of a piston-cylinder device 76. When a change of strip width is to be made, the leading end of the new strip is attached to the tail end of the previous length of strip and this operation can be carried out without the movement of the strip being stopped. When a change of strip is made, and before the strip of different width reaches the heater which is in use, a second heater of the appropriate width is moved from the store to a second operating position adjacent the first operating position.

A changeover switch 78 comprises a base board member 79 to which are attached terminals 80, 81 of a pair of sockets 82, 83, respectively. A connector blade 84, pivoted at 85 to the terminal of an ingoing source of power can be rapidly moved to switch the power from one socket to the other and plugs on the heaters are inserted in the sockets when the heaters are positioned in the correct operating position.

Thus, as shown in FIGS. 10 and 11, heaters A-F are stored in respective locations in a support frame similar to that shown in FIG. 4, but heater B is in an operating position to heat the strips. When that portion of strip $S_1$ of wider dimension than that of strip S is detected approaching the heater, the heater appropriate to the width of strip $S_1$, in this case heater E, is displaced by means of the piston-cylinder unit 76 into the second operating position. As the strip $S_1$ reaches heater B, the switch 78 is actuated to supply power to heater E, and so a rapid changeover of operation from one heater to the other is effected without the need for any stoppage of travel of the strip and a very small amount of wastage due to untreated strip. The heater B, which has now been deenergised, is then returned to the location in the support frame.

In all the embodiments of the invention, strips of different widths can readily be accommodated without the disadvantages which occur when strips of different widths are heated by one transverse flux induction heater of a particular width. The heaters can readily be moved from their locations in the support frame to the operating position and, particularly in the embodiment shown in FIGS. 10 and 11, the induction heating of strips of different widths can be accommodated with no significant non-uniform heating occurring at the changeover between the strips of different widths.

I claim:

1. An induction heating system comprising a structure having at least two support assemblies each of which is capable of supporting a transverse flux induction heater having a pair of heater elements; a transverse flux induction heater having a pair of heater elements of a first width supported by one of the assemblies; a transverse flux induction heater having a pair of heater elements of a different width supported by the other assembly; means for displacing the support assemblies so that the assemblies can be brought in turn to a changeover position close to a path taken by metal strip to be heated moving in the direction of its length; means for displacing the transverse flow induction heater supported by the assembly at the changeover position to an operating position in which the heater elements are located on opposite sides of the path and guide means for supporting the transverse flux induction heater in the operating position and as it is displaced between the operating position and the changeover position.

2. An induction heating system as claimed in claim 1, in which said path taken by the metal strip is vertical, said structure includes a fixed horizontal track and each support assembly includes a wheeled trolley displaceable along the track.

3. An induction heating system as claimed in claim 2, in which each wheeled trolley has a pair of horizontal support rails extending at right angles to said track, said support rails serving to support a transverse flux induction heater suspended on wheels therefrom.

4. An installation as claimed in claim 3, in which said guide means comprises a pair of horizontal tracks with which the rails of each wheeled trolley are alignable.

5. An induction heating system as claimed in claim 4, in which the means for displacing a heater between said changeover position and said operating position comprises a fluid operable piston-cylinder device.

6. An induction heating system as claimed in claim 1 in which said path taken by the metal strip is vertical, said support frame has said locations arranged in at least two horizontal rows, each row having at least two locations therein, and said support frame is displaceable vertically and horizontally whereby each location can be brought in turn to said position close to said path.

7. An induction heating system as claimed in claim 6, in which the support frame has wheels and is displaceable vertically in a vertical guide frame and said guide frame has wheels and is displaceable horizontally in a horizontal guide frame.

8. An induction heating system as claimed in claim 1, in which the support frame provides a continuous track and each location includes a wheeled trolley displaceable around the track.

9. An induction heating system as claimed in claim 8, in which said path taken by the metal strip is vertical, said track comprises a pair of vertically inclined guides spaced apart one behind the other on one side of said path, and each trolley has at least one wheel on each guide.

10. An induction heating system as claimed in claim 9, in which said path taken by the metal strip is vertical, and the axis of rotation of the turntable is vertical and each location on a respective radial arm of the turntable serves to support a heater suspended from the arm.

11. An induction heating system as claimed in claim 1, in which the support frame is in the form of a turntable and the locations are arranged radially of the axis of rotation of the turntable.

12. An induction heating system as claimed in claim 11, in which said path taken by the metal strip is vertical and the axis of rotation of the turntable is horizontal.

13. An induction heating system as claimed in claim 1 in which the path taken by the metal strip is substantially horizontal, said support frame is displaceable vertically in fixed vertical guides and, at each location on the support frame, there are a pair of horizontal tracks positioned one above the other and each capable of supporting one element of an induction heater.

14. An induction heating system as claimed in claim 13, in which said guide means comprises a pair of horizontal tracks positioned one above the other and with which each pair of tracks on the support frame are alignable.

15. An induction heating system as claimed in claim 13, in which said path taken by the metal strip is inclined to the horizontal and each element of an induction heater supported at a location has a surface similarly inclined to the horizontal whereby the two elements define a gap similarly inclined to the path taken by the metal strip.

16. A method of operating an induction heating system having a structure with at least two support assemblies each of which is capable of supporting a transverse flux induction heater having a pair of heater elements, and means for displacing the support assemblies so that any one of the assemblies can be brought in turn to a changeover position close to an operating position in which the heater elements are located on opposite sides of the path taken by metal strip to be heated moving in the direction of its length; said method comprising the steps of locating a transverse flux induction heater in said operating position, the width of the heater elements being appropriate for the width of the metal strip; locating a transverse flux induction heater having a pair of heater elements of a different width appropriate for metal strip of different width in one of said support assemblies and keeping one of said support assemblies empty; and when the strip to be heated is changed to strip of said different width, displacing the support assemblies so that the empty assembly is brought to the changeover position, the heater in the operating position is displaced along guide means to the support assembly at the changeover position; displacing the support assemblies to cause the assembly supporting the heater with the elements of said different width to be brought to the changeover position and the heater at the changeover position is displaced along the guide beams to the operating position.

* * * * *